(12) United States Patent
Bonney et al.

(10) Patent No.: US 6,945,017 B1
(45) Date of Patent: Sep. 20, 2005

(54) METHOD FOR MAKING A BLISTER PACKAGE

(75) Inventors: Stanley George Bonney, Ware (GB); James William Godfrey, Ware (GB)

(73) Assignee: SmithKline Beecham Corporation, Philadelphia, PA (US)

(*) Notice: Subject to any disclaimer, the term of this patent is extended or adjusted under 35 U.S.C. 154(b) by 0 days.

(21) Appl. No.: 10/031,798
(22) PCT Filed: Apr. 19, 2000
(86) PCT No.: PCT/EP00/03517
§ 371 (c)(1), (2), (4) Date: May 3, 2002
(87) PCT Pub. No.: WO00/64747
PCT Pub. Date: Nov. 2, 2000

(30) Foreign Application Priority Data
Apr. 24, 1999 (GB) .................................... 9909358

(51) Int. Cl.[7] ............................................. B65B 51/10
(52) U.S. Cl. ..................... 53/477; 53/463; 53/DIG. 2; 206/484
(58) Field of Search .................... 53/477, 549, 453, 53/463, DIG. 2, 478; 206/714, 531, 538, 206/484

(56) References Cited

U.S. PATENT DOCUMENTS

| | | | |
|---|---|---|---|
| 2,262,256 A | 11/1941 | Schoen | |
| 2,365,922 A | 12/1944 | Vaughn | |
| 4,656,814 A | * 4/1987 | Lockington | ................... 53/450 |
| 4,958,480 A | 9/1990 | Warner | |
| 5,447,010 A | 9/1995 | Voigt | |
| 5,649,411 A | 7/1997 | Dirx | |
| 5,713,182 A | 2/1998 | Croft | |
| 5,868,244 A | 2/1999 | Ivanov | |

FOREIGN PATENT DOCUMENTS

| | | |
|---|---|---|
| DE | 34 17 831 A | 11/1985 |
| EP | 0 472 850 A | 3/1992 |
| EP | 0 483 569 A | 5/1992 |

* cited by examiner

Primary Examiner—John Paradiso
(74) Attorney, Agent, or Firm—James P. Riek (57) ABSTRACT

There is provided a method of forming a blister pack comprising contacting a base sheet having a blister pocket therein with a cover sheet and applying laser energy to form a join between said cover sheet and said blister pocket of said base sheet. The blister pack is preferably in the form of an elongate strip. The blister pack is suitable for the containment of a range of different products, particularly medicaments.

37 Claims, 6 Drawing Sheets

METHOD FOR MAKING A BLISTER PACKAGE

This application is a U.S. National Phase filing, filed under 35 USC 371, of PCT Patent Application No. PCT/EP00/03517 filed 19 Apr. 2000, claiming priority to patent application no. GB 9909358.5 filed 24 Apr. 1999.

This invention relates to a method of forming a blister pack involving the use of laser welding techniques. A range of different product types may be contained within such blister packs. The blister pack is particularly suitable for the containment of medicament.

The use of blister packs as packaging for medicament is well known. Such packs are typically formed by taking a base sheet having a blister pocket therein and affixing a cover sheet thereto to form a join to the blister pocket. Known methods of fixing the cover sheet to the base sheet include the use of adhesives and welding methods selected from hot metal welding, radio frequency welding and ultrasonic welding.

The use of adhesive sealing can involve problems with controlling the spread of adhesive to ensure even adhesion of the cover sheet to the base sheet and to prevent wastage and mess.

The use of currently known welding methods has the disadvantage that controlled physical contact is required between the welding head and the substrate to be welded. This places a limitation on the speed of the welding process, which is itself required to be mechanically complex. Furthermore, with known welding methods it is difficult to produce complex weld patterns such as zig-zags and dot patterns.

The applicants have now found that the disadvantages of the above-described sealing methods can be overcome if laser energy is employed in the method of joining the blister pack. In particular, the use of laser energy reduces process complexity overall but allows for the creation of complex weld patterns. Whilst laser welding is a known technique, the advantages of the use of laser energy in the formation of blister packs has not hitherto been recognised.

Further advantages of the use of laser energy in the fabrication of the blister packs of the invention include precisely controllable low weld energy enabling the join to be formed in a precise manner without affecting any of the other parts of the blister pack. Laser welds are furthermore clean and may be engineered to be hermetic in nature to achieve good moisture protection properties. Also, since laser output is typically very stable it is possible to achieve consistent weld repeatability.

Still further advantages are achievable when the blister packs are formed from base and/or cover sheets comprising laminates of different materials. The energy of the laser source may be chosen to join only selective parts of the laminate together whilst maintaining the integrity of the other parts of the laminate. For example, the laser energy source may be focussed to pass through plastic layers in a laminate but to have a welding effect on any adjacent metal layers.

PCT Patent application no. WO98/16430 describes a method and apparatus for laser welding of plastic materials to form plastic bags. No mention is made of blister packs for use in the containment of medicament.

According to one aspect of the present invention there is provided a method of forming a blister pack comprising contacting a base sheet having a blister pocket containing a product therein with a cover sheet and applying laser energy to form a hermetically sealing join between the cover sheet and the blister pocket of the base sheet.

The join is, for example, a weld or solder join. A weld is herein considered a join formed by fusion of two materials, whereas a solder is considered to be a join formed between two materials and fusible alloy. A hermetically sealing join comprises a seal which is airtight.

Suitably, the base sheet has a plurality of blister pockets therein and laser energy is applied to form a join between the cover sheet and each blister pocket of the base sheet. Preferably, the base sheet and cover sheet are elongate (e.g. elongate strips) and the base sheet has a plurality of blister pockets spaced therealong. More preferably, laser energy is applied to join each blister pocket of the elongate base sheet in a sequential fashion.

In one aspect the laser energy derives from a laser source which is movable relative to the base and cover sheet to enable correct positioning of the join.

In another aspect, the laser energy derives from a fixed laser source and the base and cover sheet are movable to enable correct positioning of the join.

In a further aspect, the laser energy is guidable by means of a guide mechanism to enable correct positioning of the join. Preferably, the guide mechanism includes one or more movable mirrors. Optionally, the guide mechanism includes one or more galvanometer scanners.

In one aspect, the join has a zig-zag configuration. In another aspect, the join has a multi-dot configuration. In a further aspect, the join is continuous.

The laser source can be any source suitable for laser welding, including carbon dioxide, diode, fibre and copper vapour laser sources. The laser beam can also be generated by a Q-switched Neodymium Yttrium Aluminium Garnate laser source. Typically the maximum average power is from 10 W to 200 W, preferably from 25 W to 100 W and the maximum peak power is from 10 kW to 1 kW, preferably from 5 kW to 3 kW.

In one aspect, the laser energy is appliable in continuous fashion.

In another aspect, the laser energy is appliable is pulsed fashion. Preferably, the laser source has a pulse width of from 0.5 to 20 microseconds and a maximum pulse energy of from 10 to 100 Joules.

In a further aspect, the join has a join width of from 5 $\mu$m to 10 mm, preferably from 10 $\mu$m to 1 mm, more preferably from 10 to 200 $\mu$m most preferably from 20 to 100 $\mu$m.

Suitably, the base sheet and cover sheet comprise material selected from the group consisting of metal foil, organic polymeric material and paper.

Suitable metal foils include aluminium or tin foil having a thickness of from 5 to 100 $\mu$m, preferably from 10 to 50 $\mu$m. Suitable organic polymeric materials include polyethylene, polypropylene, polyvinyl chloride and polyethylene terephthalate.

Preferably, the base sheet and cover sheet comprise different materials.

The base sheet and the cover sheet may in one aspect comprise laminates of any suitable materials. The particular laminate structures are chosen to optimise the performance of the blister pack, particularly in respect of preventing air and moisture ingress and enhancing the seal characteristics.

In one aspect there is provided a method additionally comprising applying laser energy to form one or more additional joins therebetween. Preferably, the primary join has a circular shape and said one or more additional joins are concentric to the primary join.

In another aspect there is provided a method additionally comprising foldably interlocking the base sheet with the cover sheet to provide a plurality of join sites therebetween and applying laser energy to form plural joins at each said site. This method can result in a stronger seal which is more resistant to moisture and air ingress.

In a further aspect the method additionally comprises applying laser energy to form score lines on the or each cover sheet and/or base sheet. The presence of the score lines facilitates access to each blister pocket by users. The presence of the score lines on both the cover sheet and the base sheet facilitates separation of an individual blister pocket into smaller units. Optionally, score lines facilitate visual and/or electronic identification of said blister pack and/or blister pocket. Thus, for example, laser energy may be used to mark bar codes on each blister packet as an identification aid during production, quality control, distribution and retail.

In another aspect the method additionally comprises applying laser energy to cut the blister pack. Preferably the method comprises cutting the blister pack to a specifiable shape. Optionally the method comprises cutting the blister pack to a specifiable size.

In a further aspect the method comprises cutting the blister pack to provide sprocket holes therein. Optionally the method comprises cutting semi-circular incisions in the blister pack depressible to form sprocket holes therein. These sprocket holes can, on engagement with suitable sprockets, be used to drive the blister packs along a production line or within a delivery system such as a multi-dose drug delivery system.

Suitably, the method of the invention is controllable by a computer.

In one aspect, the method comprises pre-filling the or each blister pocket with an electronic component. Preferably, the electronic component is selected from the group consisting of semiconductor, integrated circuit chip, fuse and battery. Other forms of electronic components may be packaged using this method in order to protect them from moisture and dust.

In another aspect the method comprises pre-filling the or each blister pocket with food. Preferably, the food is selected from the group consisting of meat, mycoprotein, milk, cheese, flour, paste, rice, oil, sugar, confectionery, vegetable, herbal, snack, convenience and fruit foodstuffs. Examples of snack foodstuffs include potato crisps, nuts and popcorn, while convenience foods are those pre-prepared meals sold in supermarkets and similar outlets. Other foodstuffs may be packaged using this method, especially those having a short shelf life. The method can be used to package processed and un-processed food, such processing occurring either prior to or following packaging, as for example with heating or sterilisation. Food supplements, such as vitamins, may also be packaged in this manner.

In a further aspect the method comprises pre-filling the or each blister pocket with a beverage. Preferably, the beverage is selected from the group consisting of water, milk, coffee, cocoa, tea, fruit, carbonated and alcoholic drinks. Other beverages which can also be packaged in this manner include nutritional healthcare drinks.

In another aspect, the method comprises pre-filling the or each blister pocket with a toiletry. Preferably the toiletry is selected from the group consisting of toothpaste, soap, mouthwash, shampoo, skin and face cream.

In yet another aspect, the method comprises pre-filling the or each blister pocket with a cleanser. Preferably the cleanser is selected from the group consisting of soap, detergent, enzymic preparation and organic solvent.

In a further aspect, the method comprises pre-filling the or each blister pocket with a disinfectant. Preferably, the disinfectant is selected from the group consisting of sterilant, antiseptic and bleach.

In another aspect, the method comprises pre-filling the or each blister pocket with a light-sensitive material. Preferably the light sensitive material is a photographic film. Other light-sensitive materials such as chemicals and pigments can also be packaged using this method.

In a further aspect, the method comprises pre-filling the or each blister pocket with a marking material. Preferably the marking material is selected from the group consisting of toner, ink, dye, pigment, acid and alkali.

In yet a further aspect, the method comprises pre-filling the or each blister pocket with a covering material. Preferably the covering material is selected from the group consisting of paint, pigment, dye, corrosion inhibitor, electrical conductor, electrical insulator and static inhibitor.

In another aspect, the method comprises pre-filling the or each blister pocket with a toy. Preferably the toy is selected from the group consisting of model, figure, doll, animal, jig-saw and game.

In a further aspect, the method comprises pre-filling the or each blister pocket with haberdashery. Preferably the haberdashery is selected from the group consisting of button, bobbin, needle, pin, eye, hook and fastener.

In one aspect, the method comprises pre-filling the or each blister pocket with a tool. Preferably the tool comprises a domestic tool. More preferably the domestic tool is selected from the group consisting of can opener, bottle opener, ring-pool opener, scissors, knife, fork and spoon.

Optionally, the tool comprises a home maintenance tool. Preferably the home maintenance tool is selected from the group consisting of nail, screw, pin, wire, screwdriver, knife, brush, spanner, ruler and marker.

In another aspect, the method comprises pre-filling the or each blister pocket with stationery. Preferably the stationery is selected from the group consisting of pencil, pen, ruler, crayon, eraser, marker, stencil, protractor, compass and paper.

In a further aspect, the method comprises pre-filling the or each blister pocket with an adhesive. Preferably the adhesive bonds materials selected from the group consisting of paper, plastic, wood, rubber, glass and metal.

In yet a further aspect, the method comprises pre-filling the or each blister pocket with an agrochemical. Preferably the agrochemical is selected from the group consisting of herbicide, insecticide, fungicide, rodenticide, nematocide, acaracide and plant growth regulator.

In another aspect, the method comprises pre-filling the or each blister pocket with a plant seed. Preferably the plant seed is derived from plants selected from the group consisting of monocotyledonous and dicotyledonous plants.

In a further aspect, the method comprises pre-filling the or each blister pocket with a contraceptive. Preferably the contraceptive is either a contraceptive device or a contraceptive drug. Preferably the contraceptive device is selected from the group consisting of condom, diaphragm, sponge and coil. Preferably the contraceptive drug is selected from the group consisting of spermacide, estrogen, ethinyl estradiol, progesterone, levonorgestrel and norgestrel.

In yet a further aspect, the method comprises pre-filling the or each blister pocket with a medical instrument. Preferably the medical instrument is selected from the group consisting of scalpel, thermometer and syringe.

In another aspect, the method comprises pre-filling the or each blister pocket with laboratory equipment. Preferably the equipment is selected from the group consisting of dispenser tip, microbial filter, filter paper, aseptic container, petri-plate, vial, test tube, tissue-culture vessel and pipette.

In a further aspect, the method comprises pre-filling the or each blister pocket with a catemenial product. Such products are used by females during their menstrual cycle. Preferably the catemenial product comprises a tampon.

In another aspect, the method comprises pre-filling the or each blister pocket with medicament. Preferably the medicament is in dry powder, tablet, liquid, paste, cream or capsular form. Any known filling method is suitable. A suitable filling method for medicaments in powder form involves plunging the open blister pocket into a reservoir of powder, thereby causing powder to be forced into the pocket. Another suitable filling method involves the use of hollow transfer pins. The pins are plunged into a powder reservoir such that powder is retained therein, the pins then brought into registration with the pockets to be filled and the powder forced therefrom (e.g. by use of a piston ejection system) into the pockets.

Preferably, the medicament is selected from the group consisting of albuterol, salmeterol, ipratropium bromide, fluticasone propionate and beclomethasone dipropionate and salts or solvates thereof and any mixtures thereof.

According to another aspect of the present invention, there is provided a blister pack formable by any of the methods described above.

Further characteristics of the present invention will become apparent from the following description and accompanying drawings, wherein.

Figure 1:
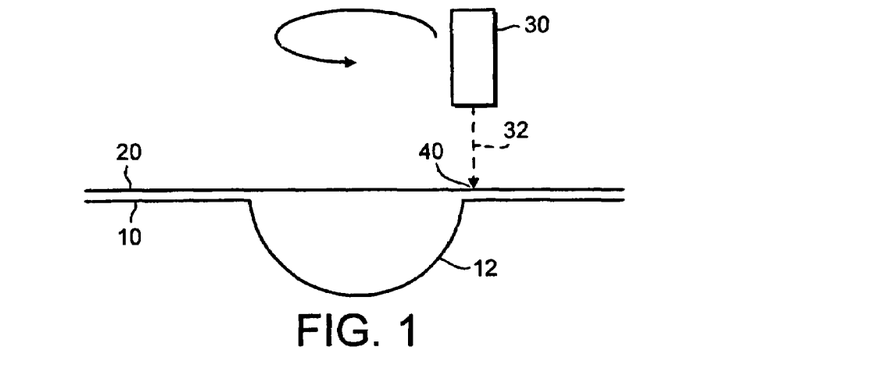
FIG. 1 shows a method of forming a blister pack having a single blister in accord with the present invention.

FIG. 1 shows an ilustrative method herein. Base sheet 10 has a blister 12 pre-formed therein. Cover sheet 20 is placed on top of the base sheet 10 such that the blister pocket 12 is covered. Laser source 30 directs a laser beam 32 at join position 40. The laser source 30 is rotated such that a join is formed between the cover sheet 20 and the periphery of the blister pocket 12.

Figure 2:
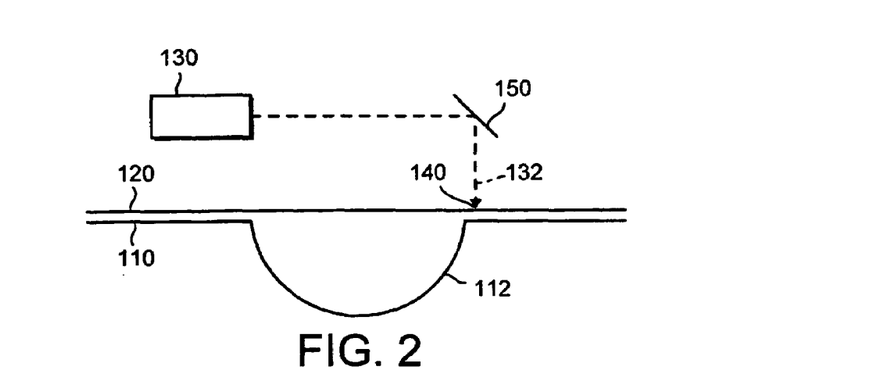
FIG. 2 shows a second method of forming a blister pack having a single blister in accord with the present invention.

FIG. 2 shows a variation of the method of FIG. 1 in which the base sheet 110 and cover sheet 120 are arranged as in FIG. 1. The laser source 130 is, however, arranged to direct a laser beam 132 at movable mirror 150. The laser beam 132 is thence directed towards the join position 140. In the course of the joining process, the mirror 150 is moved such as to direct the laser beam 132 to form a join between the cover sheet 120 and the periphery of the blister pocket 112.

Figure 3A:
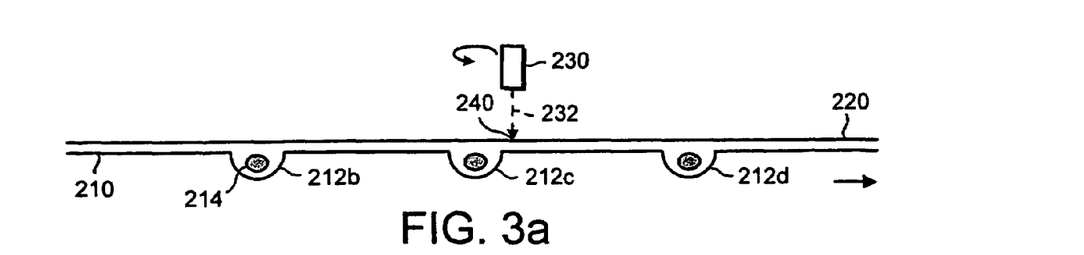
FIGS. 3a and 3b show a method of forming a blister pack in the form of an elongate strip in accord with the present invention.
Figure 3B:
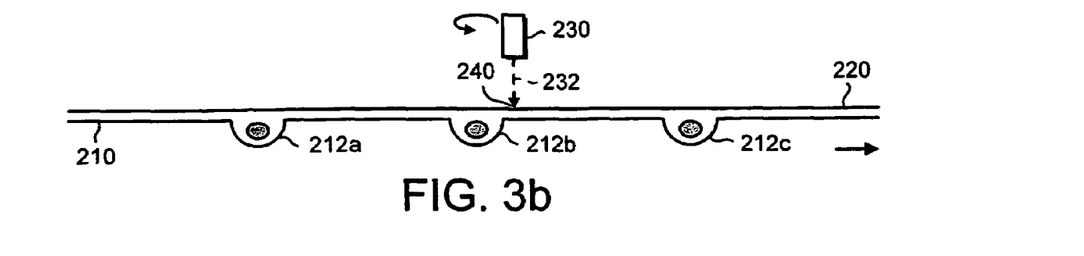

FIGS. 3a and 3b illustrate sequential steps in a step-wise process for the formation of a blister pack having a plurality of blisters. Base sheet 210 has a plurality of blisters 212a–d therein. Cover sheet 220 is placed on top of the base sheet 210 such that each of the blister pockets 212a–d is covered. At a joining station, laser source 230 directs a laser beam 232 at join position 240. In course of the process the base sheet 210 and cover sheet 220 are transported such that each blister 212a–d in turn is brought to the joining station. In forming each join, the laser source 230 is rotated to direct the laser beam 232 to form a join between the cover sheet 220 and the periphery of the blister pocket 212a–d.

Figure 4A:
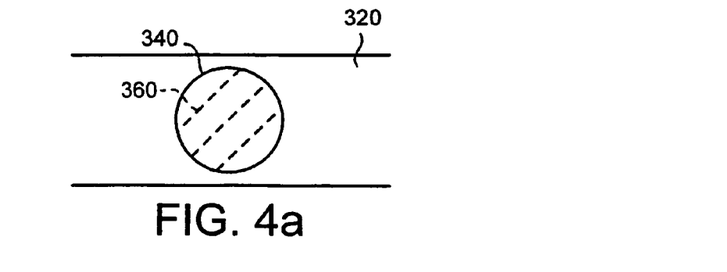
FIGS. 4a to 4c show blister join arrangements achievable with the method of the present invention.
Figure 4B:
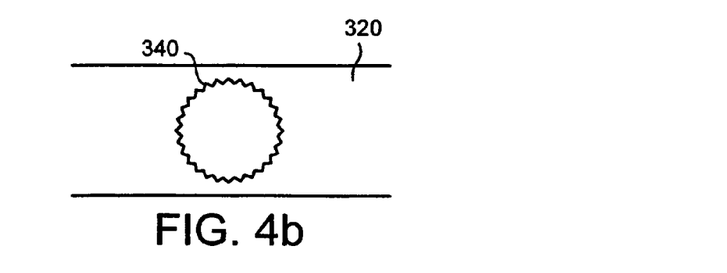
Figure 4C:
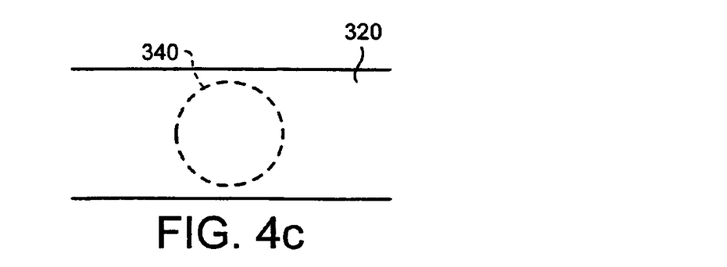

FIGS. 4a to 4c show different join configurations of blister packs formed in accord with the present invention. In each case a top view of the joined cover sheet 320 is shown. In FIG. 4a, the join is a simple line join 340 of a circular shape (i.e. around the periphery of the pocket of the base sheet below). Score lines 360 have also been laser scored in part of the cover sheet 320 to assist with the opening of the pack. In FIG. 4b, a zig-zag weld 340 configuration is shown and in FIG. 4c a multi-dot weld 340 configuration is shown. The use of such zig-zags or multi-dots makes the join 340 easier to break and thus, also improves the openability of the pack.

Figure 5:
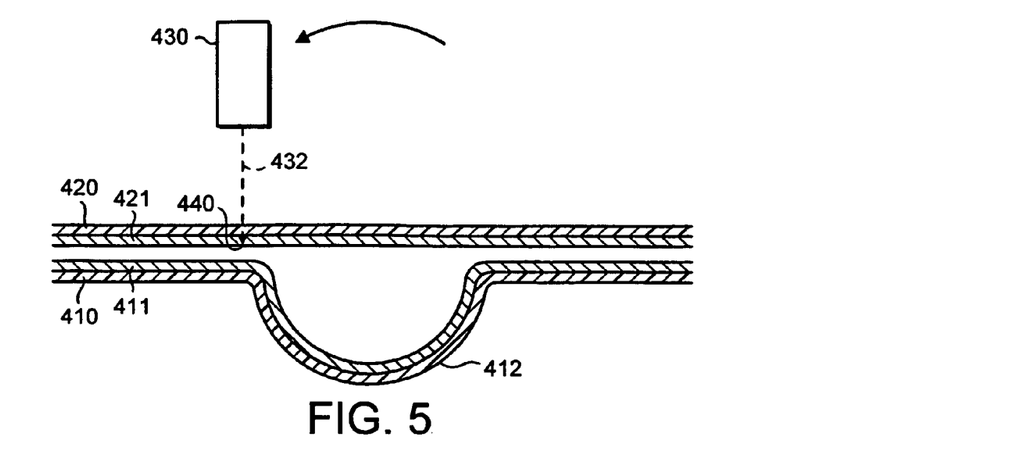
FIG. 5 shows a method of forming a blister pack having a single blister from a laminated cover and base sheet in accord with the present invention.

FIG. 5 shows a variation of the method of FIG. 1 wherein the blister pack is formed from laminated sheets. The base sheet has a first outer layer 410 comprised of plastic material and a second inner layer 411 comprised of aluminium foil. The base sheet has a blister 412 pre-formed therein. The cover sheet is also comprised of a first outer layer 420 comprised of plastic material and a second inner layer 421 comprised of aluminium foil. The cover sheet is placed on top of the base sheet such that the two aluminium layers 411, 421 contact each other and the blister pocket 412 is covered. Laser source 430 directs a laser beam 432 at join position 440. The energy of the laser source 430 is focussed such that it will pass through the cover sheet layer of plastic material 420 but join the two aluminium foil layers 411, 421 together. As in FIG. 1 the laser source 430 is rotatable such that a join may be formed for the entire pocket 412.

Figure 6:
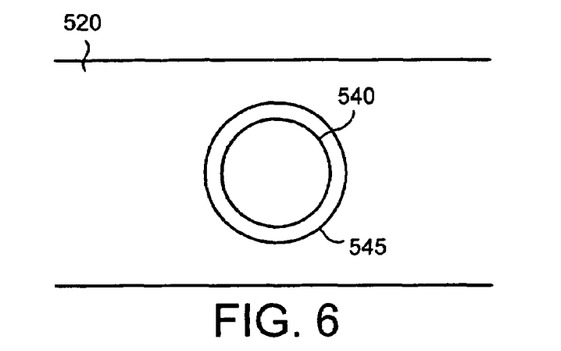
FIG. 6 depicts a blister seal arrangement involving multiple joins according to the method of the present invention.

FIG. 6 illustrates the application of multiple joins to seal a blister in a blister pack. In the schematic diagram a top view of the joined cover sheet 520 is shown. The join is a simple line join 540 of a circular shape around the periphery of the pocket of the base sheet (not shown) below. A second join 545 concentric to the first is also shown, thereby strengthening the pack and making it more resistant to moisture ingress.

Figure 7A:
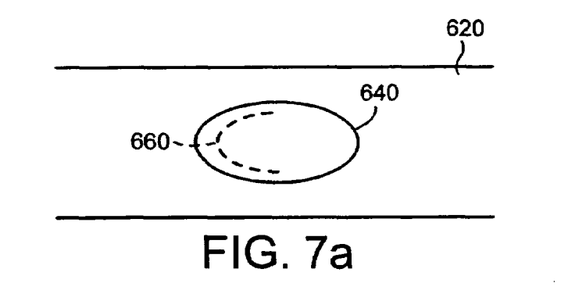
FIGS. 7a and 7b illustrate the use of score lines in opening a blister pocket in accord with the present invention.
Figure 7B:
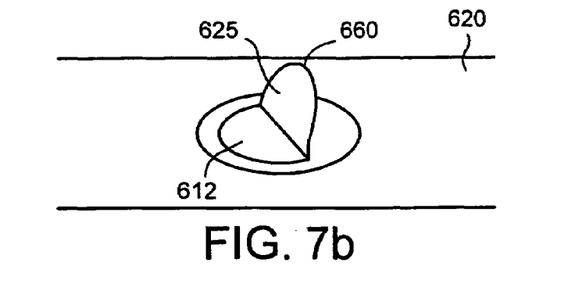

The use of score lines, to assist in opening a blister, is illustrated in FIG. 7 which shows a top view of joined cover sheet 620. In FIG. 7a line join 640 seals the top sheet 620 to the base sheet (not shown) around the blister. Score lines 660 are marked by laser to facilitate opening of the blister pocket as shown in FIG. 7b. On applying force to score line 660, flap 625 is peeled away from cover sheet 620 thereby exposing the contents of the blister pocket 612.

Figure 8:
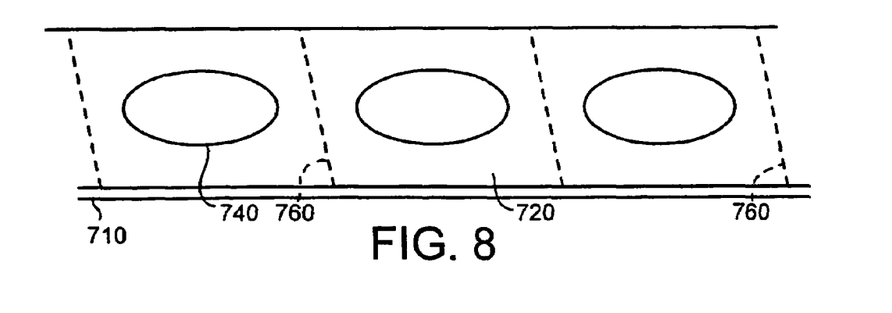
FIG. 8 shows a blister pack having laser score lines to facilitate separation of a blister pack into individual blisters, in accord with the present invention.

FIG. 8 illustrates another variation on the use of laser applied score lines in the production of blister packs. A top view of a welded cover sheet 720 of a blister pack is shown in which laser line joins 740 seal the cover sheet to the base sheet 710. Score lines 760 are formed in the cover and base sheet by laser thereby assisting in the separation of the blister pack into individual blisters, as for example where one blister is to be removed from the pack sequentially and the contents opened by a user.

Figure 9A:
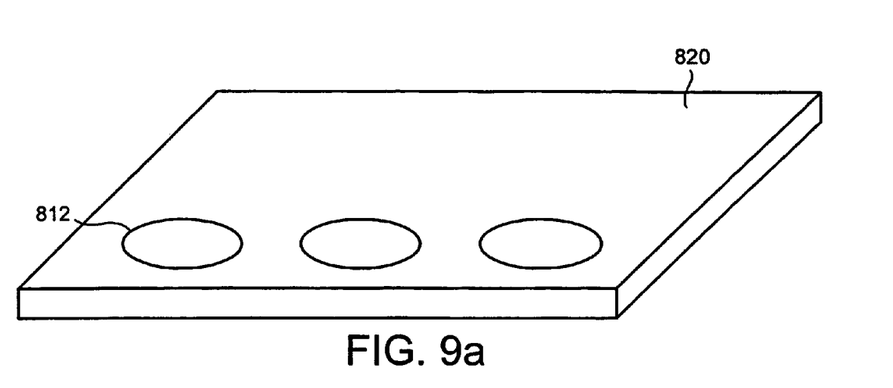
FIGS. 9a and 9b shows a blister pack formed using laser joining in accord with the present invention.
Figure 9B:
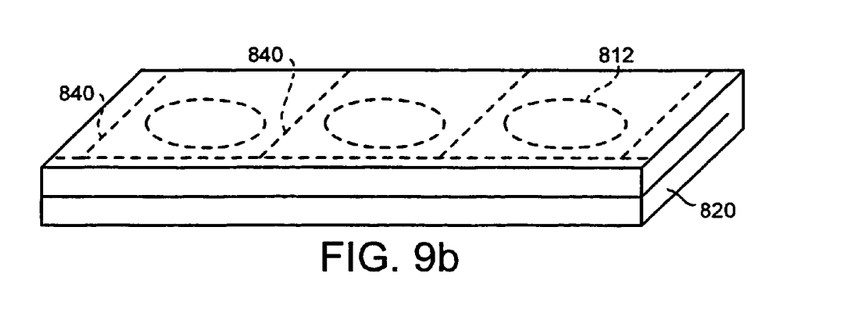

FIGS. 9a and b depict an alternative method for forming a blister pack using laser energy. FIG. 9a is a top view of sheet 820 having blister pockets 812. The sheet 820 is folded over on itself and laser energy applied along three sides of each pocket 812 to produce joins 840 (FIG. 9b). An even stronger seal can be achieved by extending the laser join along the length of the overlapping edges of the blister pack as shown in FIG. 9b.

Figure 10A:
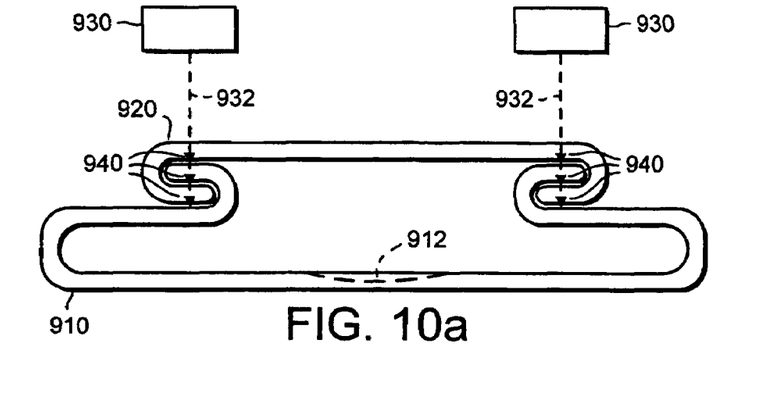
FIGS. 10a and 10b illustrate another method for forming a blister pack employing laser joining according to the present invention.
Figure 10B:
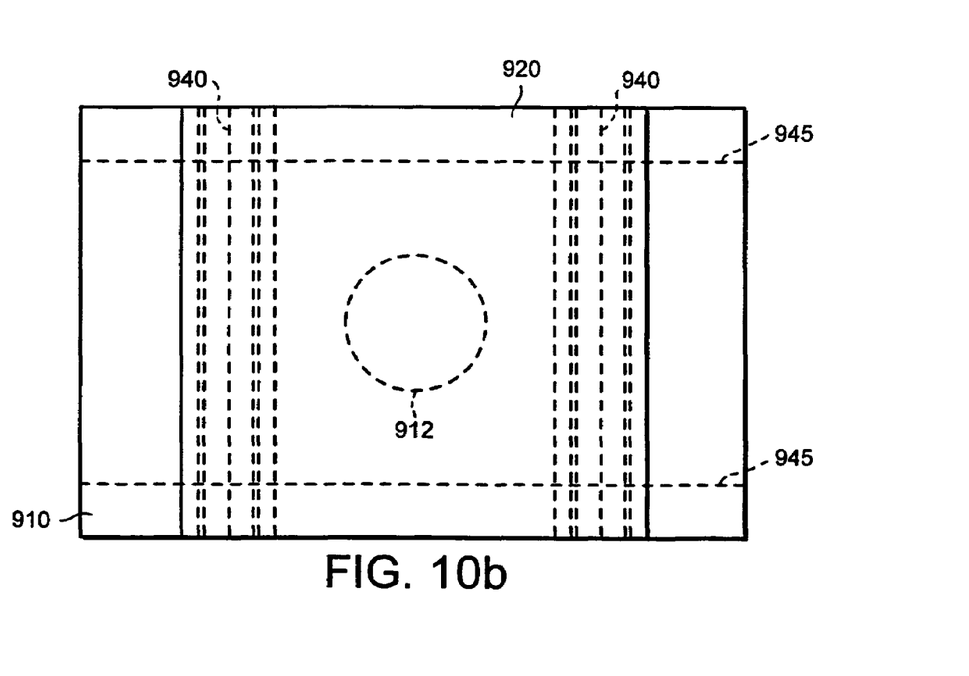

FIGS. 10a and b illustrate another method for forming a blister pack using laser energy. A beam of laser energy 932 from source 930 is focussed on interlocking ends of cover 920 and base 910 sheets, folded as shown in FIG. 10a, thus forming joins 940. In this way a series of longitudinal joins 940 join the cover 920 and base 910 sheets together. The ability of the laser to focus and join several surfaces together results in a stronger blister pack which is more resistant to moisture ingress. The pocket 912 is further sealed by forming laser joins 945 at regular intervals along the breadth of the blister pack (FIG. 10b). This method of forming a blister pack with laser energy is of particular utility in a 'strip-pack' process for manufacturing packs.

Figure 11A:
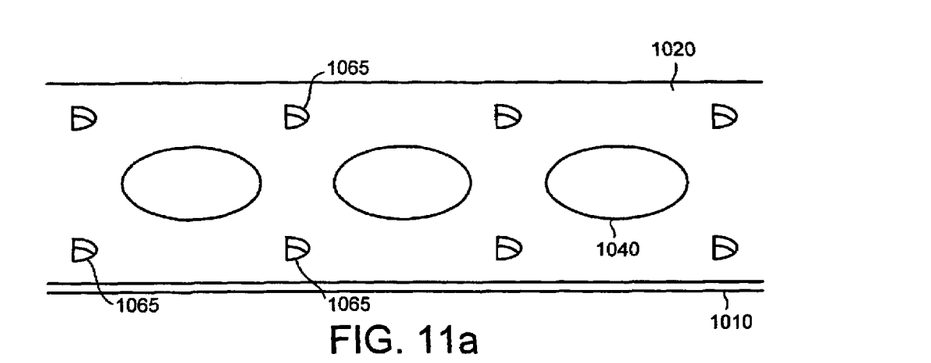
FIGS. 11a and 11b shows a blister pack in accord with the present invention having sprocket holes for engagement with a drive mechanism.

FIG. 11 depicts the application of laser energy for cutting through the blister pack to produce engagement slots for a cogwheel or similar drive mechanism to facilitate movement of the pack along a conveyor belt during manufacture and/or filling with product. A schematic top view of a blister pack is shown in FIG. 11a wherein the cover sheet 1020 has been laser joined 1040 to a base sheet 1010. Regular semicircular scores 1065 are cut through the cover and base sheets by laser such that, on depression from above, semicircular slots 1066 are formed in the blister pack.

Figure 11B:
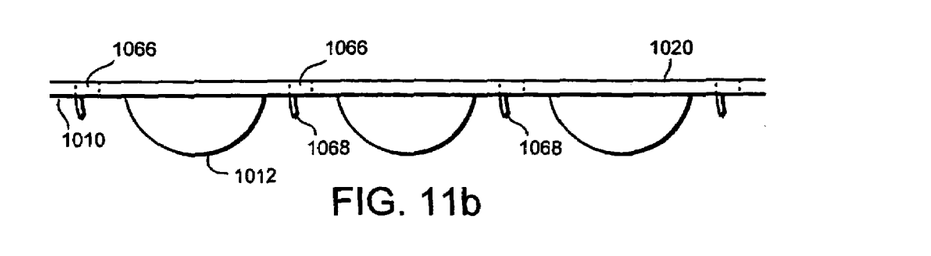

FIG. 11b shows a side view of the blister pack of FIG. 11a. The semicircular flap 1068 of top and base sheet produced on depression remains attached to the blister pack above pocket 1012, thereby avoiding problems associated with waste materials such as metallic foils during manufacture and/or filling. The semicircular slots 1066 produced are free to engage cogs in a typical drive mechanism (not shown) to move the blister pack along a conveyor belt or production line (not shown).

The blister pack herein is suitable for containing medicament, such as those for the treatment of ulcers, e.g., omeprazole, lansoprazole, lipid levels, e.g., simvastatin, atorvastatin, hypertension, e.g., amlodipine, depression, e.g. fluozetine, paroxetine, sertraline, allergies, e.g., loratidine, and psychosis, e.g., olanzapine.

In particular, the blister pack is suitable for containing medicament for the treatment of respiratory disorders. Appropriate medicaments may thus be selected from, for example, analgesics, e.g., codeine, dihydromorphine, ergotamine, fentanyl or morphine; anginal preparations, e.g., diltiazem; antiallergics, e.g., cromoglycate, ketotifen or nedocromil; antiinfectives e.g., cephalosporins, penicillins, streptomycin, sulphonamides, tetracyclines and pentamidine; antihistamines, e.g., methapyrilene; anti-inflammatories, e.g., beclomethasone dipropionate, fluticasone propionate, flunisolide, budesonide, rofleponide, mometasone furoate, ciclesonide or triamcinolone acetonide; antitussives, e.g., noscapine; bronchodilators, e.g., albuterol, salmeterol, ephedrine, adrenaline, fenoterol, formoterol, isoprenaline, metaproterenol, phenylephrine, phenylpropanolamine, pirbuterol, reproterol, rimiterol, terbutaline, isoetharine, tulobuterol or 4-hydroxy-7-[2-[[2-[[3-(2-phenylethoxy)propyl]sulfonyl]ethyl]amino]ethyl-2(3H)-benzothiazolone; diuretics, e.g., amiloride; anticholinergics, e.g., ipratropium, tiotropium, atropine or oxitropium; hormones, e.g., cortisone, hydrocortisone or prednisolone; xanthines, e.g., aminophylline, choline theophyllinate, lysine theophyllinate or theophylline; therapeutic proteins and peptides, e.g., insulin or glucagon; vaccines, diagnostics, and gene therapies. It will be clear to a person skilled in the art that, where appropriate, the medicaments may be used in the form of salts, (e.g., as alkali metal or amine salts or as acid addition salts) or as esters (e.g., lower alkyl esters) or as solvates (e.g., hydrates) to optimise the activity and/or stability of the medicament and/or to minimise the solubility of the medicament in the propellant.

Preferred medicaments are selected from albuterol, salmeterol, ipratropium bromide, fluticasone propionate and beclometasone dipropionate and salts or solvates thereof, e.g., the sulphate of albuterol and the xinafoate of salmeterol.

Medicaments can also be delivered in combinations. Preferred formulations containing combinations of active ingredients contain salbutamol (e.g., as the free base or the sulphate salt) or salmeterol (e.g., as the xinafoate salt) in combination with an antiinflammatory steroid such as a beclomethasone ester (e.g., the dipropionate) or a fluticasone ester (e.g., the propionate). A particularly preferred combination comprises salmeterol xinafoate salt and fluticasone propionate.

It may be appreciated that any of the parts of the blister pack or medicament delivery system used therewith which contact the medicament may be coated with materials such as fluoropolymer materials which reduce the tendency of medicament to adhere thereto. Suitable fluoropolymers include polytetrafluoroethylene (PTFE) and fluoroethylene propylene (FEP). Any movable parts may also have coatings applied thereto which enhance their desired movement characteristics. Frictional coatings may therefore be applied to enhance frictional contact and lubricants used to reduce frictional contact as necessary.

It will be understood that the present disclosure is for the purpose of illustration only and the invention extends to modifications, variations and improvements thereto.

The application of which this description and claims form part may be used as a basis for priority in respect of any subsequent application. The claims of such subsequent application may be directed to any feature or combination of features described therein. They may take the form of product, method or use claims and may include, by way of example and without limitation, one or more of the following claims:

What is claimed is:

1. A method of forming a blister pack comprising contacting a base sheet having a blister pocket containing a product therein with a cover sheet and applying laser energy from a laser to form a hermetically sealing join between said cover sheet and said blister pocket of said base sheet, wherein both the cover sheet and the base sheet comprise at least one layer of metal foil and said join comprises a metal-to-metal join between said metal foil layers.

2. A method according to claim 1, wherein the base sheet has a plurality of blister pockets therein and laser energy is applied to form a join between the cover sheet and each blister pocket of said base sheet.

3. A method according to claim 2, wherein the base sheet and cover sheet are elongate and the base sheet has a plurality of blister pockets spaced therealong.

4. A method according to claim 3, wherein laser energy is applied to join each blister pocket of the elongate base sheet in a sequential fashion.

5. A method according to claim 1, wherein the laser energy derives from a laser source which is movable relative to the base and cover sheet to enable correct positioning of the join.

6. A method according to claim 1, wherein the laser energy derives from a fixed laser source and the base and cover sheet are movable to enable correct positioning of the join.

7. A method according to claim 1, wherein the laser energy is guidable by means of a guide mechanism to enable correct positioning of the join.

8. A method according to claim 7, wherein said guide mechanism includes one or more movable minors.

9. A method according to claim 7, wherein the guide mechanism includes one or more galvanometer scanners.

10. A method according to claim 1, wherein the join has a zig-zag configuration.

11. A method according to claim 1, wherein the join has a multi-dot configuration.

12. A method according to claim 1, wherein the join is continuous.

13. A method according to claim 1, wherein the laser energy is supplied by a laser source having a maximum average power of from 10 W to 200 W, and a maximum peak power of from 1 kW to 10 kW.

14. A method according to claim 1, wherein the laser energy is appliable in continuous fashion.

15. A method according to claim 1, wherein the laser energy is appliable in pulsed fashion.

16. A method according to claim 15, wherein the laser source has a pulse width of from 0.5 to 20 microseconds and a maximum pulse energy of from 10 to 100 Joules.

17. A method according to claim 1, wherein the join has a join width of from 5 $\mu$m to 10 mm, preferably from 10 $\mu$m to 1 mm, more preferably from 10 to 200 $\mu$m, most preferably from 20 to 100 $\mu$m.

18. A method according to claim 1, wherein the base sheet and cover sheet comprise material selected from the group consisting of metal foil, an organic polymeric material and paper.

19. A method according to claim 18, wherein the base sheet and cover sheet comprise different materials.

20. A method according to claim 18, wherein the base sheet and/or the cover sheet comprises a laminate.

21. A method according to claim 1, additionally comprising applying laser energy to form one or more additional joins between each blister pocket.

22. A method according to claim 21, wherein said one or more additional joins are concentric to the join.

23. A method according to claim 1, additionally comprising foldably interlocking the base sheet with the cover sheet to provide a plurality of join sites therebetween and applying laser energy to form plural joins at each said site.

24. A method according to claim 1, additionally comprising applying laser energy to form score lines on the or each cover sheet and/or base sheet.

25. A method according to claim 24, wherein said score lines facilitate access to each blister pocket.

26. A method according to claim 24, wherein the score lines facilitate separation of an individual blister pocket from the blister pack.

27. A method according to claim 24, wherein the score lines facilitate visual and/or electronic identification of said blister pack and/or blister pocket.

28. A method according to claim 1, additionally comprising applying laser energy to cut the blister pack.

29. A method according to claim 28, comprising cutting the blister pack to a specifiable shape.

30. A method according to claim 28, comprising cutting the blister pack to a specifiable size.

31. A method according to claim 28, comprising cutting the blister pack to provide sprocket holes therein.

32. A method according to claim 31, comprising cutting semi-circular incisions in the blister pack depressible to form sprocket holes therein.

33. A method according to claim 1, wherein the method is controllable by a computer.

34. A method according to claim 1, wherein the product comprises a medicament.

35. A method according to claim 34, wherein said medicament is in dry powder, tablet, liquid, paste, cream or capsular form.

36. A method according to claim 34, wherein said medicament is selected from the group consisting of albuterol, salmeterol, ipratropium bromide, fluticasone propionate and beclomethasone dipropionate and salts or solvates thereof and any mixtures thereof.

37. Blister pack formable by the method of claim 1.

* * * * *